US005605985A

United States Patent [19]

Rademacher et al.

[11] Patent Number: 5,605,985
[45] Date of Patent: Feb. 25, 1997

[54] POWDER COATING AND ITS USE FOR INTERNAL COATING OF PACKAGING CONTAINERS

[75] Inventors: Josef Rademacher, Münster; Udo Reiter, Telgte; Peter Lessmeister, Münster, all of Germany

[73] Assignee: BASF Lacke + Farben, AG, Muenster-Hiltrup, Germany

[21] Appl. No.: 256,891

[22] PCT Filed: Feb. 3, 1993

[86] PCT No.: PCT/EP93/00243

§ 371 Date: Aug. 10, 1994

§ 102(e) Date: Aug. 10, 1994

[87] PCT Pub. No.: WO93/16141

PCT Pub. Date: Aug. 19, 1993

[30] Foreign Application Priority Data

Feb. 13, 1992 [DE] Germany ............... 42 04 266.6

[51] Int. Cl.$^6$ .............. C08F 283/00; C08G 8/28; C08L 61/00

[52] U.S. Cl. .............. 525/481; 525/482; 525/523; 525/533; 525/934; 428/413; 428/418

[58] Field of Search .................. 523/440, 481; 525/482, 523, 533, 934; 428/413, 418

[56] References Cited

U.S. PATENT DOCUMENTS

| | | | |
|---|---|---|---|
| 3,970,621 | 7/1976 | Kondo et al. | 525/934 |
| 4,169,187 | 9/1979 | Glazar | 525/482 |
| 4,183,974 | 1/1980 | Coucher et al. | 427/28 |
| 4,251,426 | 2/1981 | McClure et al. | |
| 4,734,468 | 3/1988 | Marx | 525/524 |
| 5,049,596 | 9/1991 | Fujimoto et al. | 525/485 |
| 5,319,001 | 6/1994 | Morgan et al. | 523/206 |

FOREIGN PATENT DOCUMENTS

| | | |
|---|---|---|
| 0119164 | 3/1984 | European Pat. Off. . |
| 61-151274 | 7/1986 | Japan . |
| 2055843A | 3/1981 | United Kingdom . |

OTHER PUBLICATIONS

Encyclopedia of Science and Technology, vol. 6, 1986, pp. 350–351.

Holderegger, "Epoxy Resin Powder Coating Composition", Apr. 9, 1987, pp. 1–43.

*Primary Examiner*—John C. Bleutge
*Assistant Examiner*—Randy Gulakowski

[57] ABSTRACT

The present invention relates to a powder coating, in particular for internal coating of packaging containers, which is characterized in that it 1.) comprises at least one epoxy resin having an epoxide equivalent weight of from 300 to 5500 and at least one hardener having more than one phenolic hydroxyl group per molecule and a hydroxyl equivalent weight, based on the phenolic OH groups, of from 100 to 500, and 2.) has a particle size distribution such that at least 90 percent by weight of the powder coating particles have a particle size of between 1 and 60 μm, the maximum particle size of the powder coating particles is ≦100 μm, the mean particle size of the powder coating particles is between 5 and 20 μm and the gradient of the particle distribution curve at the point of inflexion is ≧100.

12 Claims, No Drawings

POWDER COATING AND ITS USE FOR INTERNAL COATING OF PACKAGING CONTAINERS

The present invention relates to powder coatings, in particular for internal coating of packaging containers, based on epoxy resins and phenolic hardeners.

The present invention moreover relates to a process for internal coating of packaging containers, and to the use of the powder coatings.

Packaging containers, such as, for example, preserve cans, two- and three-component drinks cans and the like, are provided with a coating on the inside, on the one hand to protect the contents from deterioration due to constituents of the sheet metal being dissolved out, and on the other hand to avoid corrosion of the sheet metal by aggressive contents.

In practice, packaging containers are coated in this way mainly by means of organically dissolved coatings. However, this results in an increased pollution of the environment by solvents during drying of the coating films. Attempts are therefore increasingly being made to replace these coatings by low-solvent or solvent-free coatings. Thus, for example, thermoplastic powder coatings are often already used for covering can weld seams. These products are produced from the corresponding thermoplastics by expensive cold grinding.

Thermosetting powder coatings for covering the weld seams of metal containers employed for holding foodstuffs or drinks are known from EP-B-119164. These thermosetting powder coatings comprise, as a binder, a mixture of an aromatic epoxy resin having on average not more than 2 epoxide groups per molecule and an aromatic epoxy resin having on average more than 2 epoxide groups per molecule. The condensation product of the diglycidyl ether of bisphenol A with bisphenol A, having an equivalent weight, based on phenolic hydroxyl groups, of 220 to 280 or an acid polyester or a mixture thereof is employed as the hardener.

These powder coatings are employed only for covering the weld seams of packaging containers. EP-B-119164 contains neither indications of also employing these powder coatings for internal coating of packaging containers, nor indications of how these powder coatings are to be modified for use as internal protective coatings. In particular, EP-B-119 164 contains no information on particle sizes and particle size distributions of the powder coatings. However, the use of these powder coatings of EP-B-119 164 with a particle size distribution customary for powder coatings leads to coatings which have too high a porosity at the low coating thicknesses of $\leq 15$ μm customary for internal coating finishes.

Thermosetting solvent-containing and solvent-free coating agents for coating car bodies, machinery, plant and containers, comprising an epoxy resin having more than one 1,2-epoxide group per molecule and a polyol having more than one phenolic OH group per molecule as well as other customary auxiliaries and additives furthermore are known from DE Patent 23 12 409.

For the production of automobile top coatings, according to DE Patent 23 12 409 a powder coating having a particle size of not more than 0.044 mm is applied in a dry-film thickness of 25 μm. Neither the particle size nor the particle size distribution of the powder coating particles is reported for powder coatings which are suitable for the production of internal coatings on packaging containers. Nor does DE Patent 23 12 409 contain any indication that the particle size and particle size distribution are to be adjusted specifically according to the intended use of the powder coatings.

However, powder coatings having a maximum particle size of 44 μm and a conventional particle size distribution are unsuitable for the production of internal coatings for packaging containers in the conventional low coating thickness of $\leq 15$ μm, since the resulting coatings have too high a porosity.

Powder coatings for internal coating of cans comprising an epoxy resin and a hardener furthermore are disclosed by U.S. Pat. No. 3,962,486. Catalytic hardeners, aromatic amines, epoxy-amine adducts and acid anhydrides are mentioned as typical hardeners in U.S. Pat. No. 3,962,486, while phenolic hardeners are not mentioned. Coatings which meet the requirements usually imposed on internal coatings of foodstuffs packaging even at low coating thicknesses of less than 13 μm can be produced by using the plasma spray coating process. To ensure that application by means of the plasma spray process is possible, only powder coatings which have a maximum particle size of $\leq 100$ μm and a sufficiently low melt viscosity may be employed. However, the particle size distribution of the powder coatings used is not characterized in more detail in U.S. Pat. No. 3,962,486.

A disadvantage of the powder coatings described in U.S. Pat. No. 3,962,486 is the inadequate resistance of the resulting coatings to sterilization due to the use of aminic hardeners. It is furthermore a disadvantage that epoxy resins hardened with amines tend to become brittle and have very poor elasticities. Acid anhydride hardeners have the disadvantage that they are highly irritating, and special safety precautions are therefore required during formulation of the powder coatings.

Powder coatings for internal coating of cans, which likewise comprise an epoxy resin and an amine hardener, furthermore are known from U.S. Pat. No. 4,183,974. These powder coatings have mean particle sizes of between 1 and 100 μm, preferably between 1 and 10 μm. Although the resulting coatings already display the required low porosity at coating thicknesses of $\leq 13$ μm, the resistance of the resulting coatings to sterilization is in turn in need of improvement. It is furthermore a disadvantage that epoxy resins hardened with amines tend to become brittle and have very poor elasticities.

Finally, powder coatings which are based on epoxy resins and which, after appropriate adjustment of the particle size distribution of the powder coating particles, are suitable both for internal coating of packaging containers and for covering weld seams are known from the not previously published German Patent Application P 40 38 681.3. These powder coatings contain, as hardeners, polyesters containing carboxyl groups. The use of phenolic hardeners is not described in this patent application.

The present invention is thus based on the object of providing powder coatings which meet the requirements usually imposed on internal coatings for cans, even when low coating thicknesses of $\leq 15$ μm are applied, when said powder coatings are used for internal coating of packaging containers. In particular, these internal coatings should not be porous (determined with the aid of the so-called enamel rater test), should display good adhesion to the substrate, should have a high elasticity, and should be stable under the customary pasteurization and sterilization conditions. The powder coatings should in this case be hardenable over the short drying times customary in the coating of cans.

This object is achieved, surprisingly, by a powder coating based on epoxy resins and phenolic hardeners, particular for internal in coating of packaging containers, characterized in that 1.) the powder coating comprises A) at least one epoxy resin having an epoxide equivalent weight of from 300 to 5500 and B) at least one hardener having more than one phenolic hydroxyl group per molecule and a hydroxyl equivalent weight, based on the phenolic OH groups, of from 100 to 500, and 2.) the powder coating has a particle size distribution such that a) at least 90 percent by weight of the powder coating particles have a particle size of between 1 and 60 μm, b) the maximum particle size of at least percent by weight of the powder coating particles is ≦100 μm, c) the mean particle size of the powder coating particles is between 5 and 20 μm and d) the gradient of the particle distribution curve at the point of inflection is >100.

The invention furthermore relates to processes for internal coating of packaging containers, in which these powder coatings are applied.

The invention finally also relates to the use of the powder coatings for internal coating of packaging containers.

It is surprising and was not foreseeable that the profile of properties and therefore the intended use of powder coatings based on epoxy resins and phenolic hardeners can be controlled specifically by establishing a specific particle size distribution.

The powder coatings according to the invention also can be hardened quickly, are easy to handle and are easy to apply.

Moreover, the powder coatings according to the invention are distinguished by the fact that coatings having only very low coating thicknesses of ≦15 μm have the properties required for internal coatings by can manufacturers. In particular, these coatings have the required low porosity even at a low coating thickness of ≦15 μm. Moreover, these coatings are distinguished by good adhesion, high flexibility and a good resistance to pasteurization and sterilization.

The individual components of the powder coatings according to the invention will now first be explained below in more detail.

The epoxy resins (component A) employed in the powder coatings according to the invention are solid epoxy resins having an epoxide equivalent weight of from 300 to 5500. Aromatic, aliphatic and/or cycloaliphatic epoxy resins are suitable as component A. Aromatic epoxy resins based on bisphenol A and/or bisphenol F and/or epoxy resins of the novolac type are preferably employed. The epoxy resins based on bisphenol A or bisphenol F which are particularly preferably employed have an epoxide equivalent weight of from 500 to 2000. Epoxy resins of the novolac type which are particularly preferably employed have an epoxide equivalent weight of from 500 to 1000.

Epoxy resins based on bisphenol A or bisphenol F in general in this context have a functionality of not more than 2, and epoxy resins of the novolac type have a functionality of in general at least 2. However, the epoxy resins based on bisphenol A or bisphenol F also can be brought to a functionality of more than 2 by branching, for example by means of trimethylolpropane, glycerol, pentaerythritol or other branching reagents.

Other epoxy resins, such as, for example, alkylene glycol diglycidyl ethers or branched secondary products thereof, epoxy resins based on bisphenol A or F which have been rendered flexible with alkylene glycols or the like, can of course also be employed. Mixtures of various of the epoxy resins mentioned are furthermore also suitable.

Suitable epoxy resins are, for example, the products obtainable commercially under the following names: Epikote® 154, 1001, 1002, 1055, 1004, 1007, 1009 and 3003-4F-10 from Shell-Chemie, XZ 86 795 and DER® 664, 667, 669, 662, 642U and 672U from Dow, and Araldit®, GT 6064, GT 7072, GT 7203, GT 7004, GT 7304, GT 7097 and GT 7220 from Ciba Geigy.

FDA-approved epoxy resins are preferably employed here.

Suitable hardener components B are all the solid compounds having more than one phenolic OH group, preferably 1.8 to 4, particularly preferably ≦3, especially preferably 1.8 to 2.2 phenolic OH groups per molecule, and a hydroxyl equivalent weight, based on the phenolic OH groups, of from 100 to 500, preferably from 200 to 300.

Hardeners based on bisphenol A and/or bisphenol F are preferably employed as the hardener. The condensation product of the diglycidyl ether of bisphenol A or bisphenol F with bisphenol A or bisphenol F, in particular the condensation product having an equivalent weight, based on the phenolic hydroxyl groups, of from 220 to 280, is particularly preferred as the hardener. These condensation products are usually prepared by reaction of, in general, excess bisphenol with a bisphenol diglycidyl ether in the presence of a suitable catalyst. The condensation product is preferably prepared by reaction of the diglycidyl ether with the bisphenol in a weight ratio of from 0.5 to 2. These hardeners based on said condensation products of the bisphenol diglycidyl ether with a bisphenol in general have a functionality of not more than 2, it being possible in turn to establish higher functionalities by using branching reagents.

Furthermore, the reaction products of bisphenols with epoxy resins of the novolac type are also suitable as hardeners. These hardeners are preferably obtained by reaction of the epoxy resin with the bisphenol in a weight ratio of from 0.5 to 2 in the presence of a suitable catalyst.

The phenolic hardeners described in DE-PS-23 12 409 in column 5, line 2 to column 6, line 55, for example, are suitable. These polyphenols correspond to the following general formulae

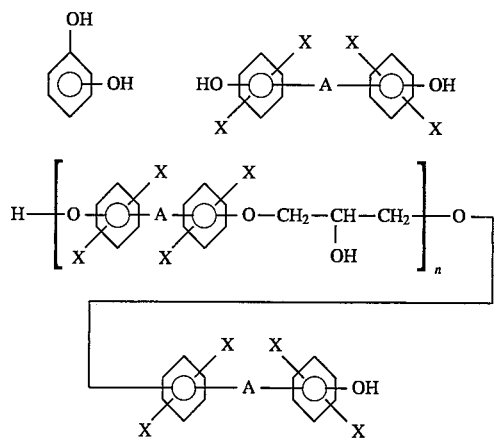

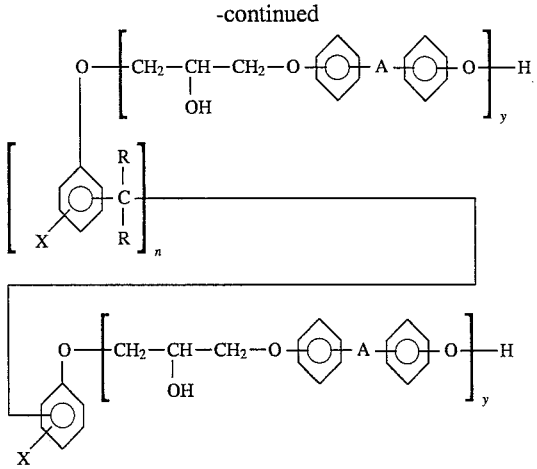

in which
A is a divalent hydrocarbon radical having from 1 to 6 C atoms or the radicals

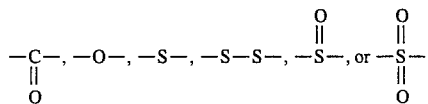

X is a hydrogen or an alkyl radical having 1 to 4 C atoms,
n assumes a mean value of from 1 to 9, preferably from 2 to 7,
and
y assumes a value of 0 or 1.

Furthermore, the phenolic hardeners described in DEA-30 27 140 can also be employed.

Hardeners modified with branching agents and/or hardeners which have been rendered flexible are of course also suitable. Mixtures of various hardeners of those mentioned can also be employed.

FDA-approved hardeners are preferably employed here.

Epoxy resin component A is usually employed in the powder coatings according to the invention in an amount of from 29 to 80% by weight, preferably from 39 to 60 % by weight, in each case based on the total weight of the powder coating.

Hardener component B is usually employed in the powder coatings according to the invention in an amount of from 10 to 50% by weight, preferably from 15 to 40% by weight, in each case based on the total weight of the powder coating.

The powder coatings according to the invention comprise, as a further component C, at least one hardening catalyst, usually in an amount of from 0.01 to 5.0% by weight, preferably from 0.05 to 2.0% by weight, in each case based on the total weight of the powder coating.

The catalyst is advantageously imidazole, 2methylimidazole, ethyltriphenylphosphonium chloride or another salt thereof, a quinoline derivative, as described, for example, in EP-B-10805, a primary, secondary or tertiary aminophenol, aluminum acetyl acetonate or a toluenesulfonic acid salt, or a mixture of various of the catalysts mentioned.

The commercially available hardeners containing hydroxyl groups usually already comprise a hardening catalyst.

Examples of such commercially available hardeners containing hydroxyl groups which are preferably employed are the products available commercially under the following names: D.E.H.®81, D.E.H.® 82 and D.E.H.® 84 from Dow, Hardener XB 3082 from Ciba Geigy and Epikure® 169 and 171 from Shell-Chemie.

The powder coatings according to the invention furthermore can also comprise from 0 to 55% by weight, preferably from 15 to 25% by weight, of fillers (component D). FDA-approved fillers are preferably employed.

Inorganic fillers, for example titanium dioxide, such as, for example, Kronos 2160 from Kronos Titan, Rutil R 902 from Du Pont and RC 566 from Sachtleben, barium sulfate and fillers based on silicate, such as, for example, talc, kaolin, magnesium aluminum silicates, mica and the like, are usually employed. Titanium dioxide and fillers of the quartz sand type are preferably employed.

The powder coatings according to the invention furthermore can also comprise, if appropriate, from 0.01 to 10% by weight, preferably from 0.1 to 2% by weight, based on the total weight of the powder coating, of other auxiliaries and additives. Examples of these are leveling agents, trickle aids, deaerating agents, such as, for example, benzoin, pigments or the like.

The powder coatings are prepared by the known methods (compare, for example, product information from BASF Lacke & Farben AG, "Pulverlacke", 1990) by homogenization and dispersion, for example by means of an extruder, screw kneader and the like. It is essential to the invention that, after their preparation, the powder coatings are adjusted by grinding and, if appropriate, by sifting and sieving to a particle size distribution appropriate for the intended use.

For use for internal coating of packaging containers, the particle size distribution is adjusted so that at least 90% by weight of the powder coating particles have a particle size between 1 and 60 μm, that is to say d 90=1 to 60 μm. Preferably, 90 percent by weight of the powder coating particles have a particle size between 1 and 40 μm (d 90=1 to 40 μm), and particularly preferably between 5 and 25 μm (d 90=5 to 25 μm). The maximum size of the powder coating particles for at least 99 percent by weight of the particles is ≦100 μm, preferably ≦60 μm and particularly preferably <40 μm. The mean particle size of the powder coating particles is between 5 and 20 μm, particularly preferably between 5 and 12 μm. It is furthermore essential to the invention that, when the powder coatings are used for internal coating of the packaging containers, the particle size distribution is adjusted so that the gradient S of the particle distribution curve at the point of inflection is≧100, preferably ≧150 and particularly preferably ≧200. To achieve coatings having particularly good properties, powder coatings in which the gradient S of the particle size distribution curve at the point of inflection is ≧300 are especially preferably employed.

The gradient S is defined here as the limiting value for $f(x_2)-f(x_1)$ tending to zero of $(f(x_2)-f(x_1))/\log((x_2/x_1))$ at the point of inflection of the particle distribution curve. The particle distribution curve here is the plot of the cumulative percentages by weight ($f(x)$) against the absolute particle diameter ($x$), the particle diameter being plotted on a logarithmic scale and the cumulative percentages by weight on a linear scale. For use as an internal coating on packaging containers, powder coatings which have both only a low proportion of very fine particles (particle size <5 μm) and at the same time also only a very low proportion of coarse powder coating particles (particle size >25 μm), i.e. as narrow as possible particle size distribution, are thus particularly suitable.

The particular particle size distribution of the powder coatings is adjusted with suitable grinding units, if appropriate in combination with suitable sifting and sieving devices, for example with fluidized bed countercurrent mills (AFG) from Alpine, Augsburg, in combination with Turboplex extra-fine sifters from Alpine, Augsburg.

The packaging containers, which are coated with the powder coatings according to the invention can be made of the most diverse materials, may have the most diverse sizes and shapes and may have been produced by various processes. In particular, however, metallic containers are coated with the powder coatings according to the invention. These metallic containers may have been produced by first rolling sheet metal and then joining it by folding back the edge. The end pieces can then be attached to the cylinder thus formed. The powder coatings according to the invention are employed for internal coating of the can bodies, which in general already have a base. Deep-drawn metal containers furthermore can also be coated on the inside with the powder coatings according to the invention. However, the powder coatings are of course also suitable for coating can lids and can bases.

Scratch lines on easy-open ends furthermore can also be repaired.

The packaging containers can be made of the most diverse materials, such as, for example, aluminum, black sheet, tin sheet and various iron alloys, which are provided, if appropriate, with a passivating coating based on compounds of nickel, chromium and tin.

Containers of this type are usually used as containers for foodstuffs and drinks, for example for beer, juices, carbonated drinks, soups, vegetables, meat dishes, fish dishes and vegetables, but also, for example, for animal foods.

The application is carried out by known methods, such as are described, for example, in U.S. Pat. No. 4,183,974. Electrostatic charging of the powder coating particles is effected here by friction (triboelectricity). The powder coating particles are applied with the aid of special spray heads known to those skilled in the art. The powder coatings according to the invention can of course also be applied by the known process of electrostatic assistance.

For internal coating of packaging containers, the powder coatings are usually applied in a coating thickness of ≦15 μm, preferably of from 10 to 14 μm.

Even at these low coating thicknesses, the coatings meet the requirements usually imposed on such films. However, the powder coatings can of course also be applied in higher coating thicknesses.

The packaging container, the inside of which has been provided with the powder coating according to the invention, is then subjected to a heat treatment for hardening the powder coating. This heat treatment can be carried out in various ways. In practice, the containers are often conveyed through a tunnel oven for this purpose. During this operation, the powder coatings in general harden completely at object temperatures of between 230° and 350° C. within a period of from 5 to 30 seconds. The tunnel oven here can be operated at a constant temperature, or can have a temperature profile adjusted to suit the particular circumstances.

The invention will now be explained in more detail with the aid of working examples. All the data on parts and percentages here are weight data, unless expressly stated otherwise. The powder coatings were in each case prepared by weighing all the constituents into canisters and premixing them in a premixer, and homogenizing the mix at 60° to 80° C. by means of an extruder, cooling it as quickly as possible and adjusting it to the desired particle size distribution with grinding units.

EXAMPLE 1

The following components were processed to give powder coating 1:
580 parts of commercially available epoxidized novolac resin having an EEW of 500 (commercial product D.E.R®642U from Dow),
270 parts of commercially available hardener, containing OH groups, based on bisphenol A having a hydroxyl equivalent weight of 250 (commercial product D.E.H.® 82 from Dow),
5 parts of commercially available leveling agent based on an oligomeric acrylate,
143 parts of finely divided silicate-based filler of the quartz sand type and
2 parts of fluidization auxiliary based on pyrogenic silicic acid or aluminum oxide.

Using grinding units, the particle size distribution was adjusted so that at least 90% by weight of the powder coating particles have a particle size of between 1 and 25 μm (d 90=1 to 25 μm). The maximum particle size of at least 99% by weight of the particles is ≦100 μm, and the mean particle size is 9 μm. The gradient S at the point of inflection of the particle distribution curve is 250.

This powder coating 1 was applied to a can body (opening ⌀73 mm, body length=110 mm) by means of suitable equipment, stoved for 30 seconds at an object temperature of 280° C. and then subjected to an enamel rater test: the coated can was dipped in a Cu/Cd standard solution S475 (conductance 2.2±0.2 mS/cm) and connected as the cathode. A voltage of 6.3 V was applied over a period of 4 seconds, and the current intensity was measured. The current strength I=1 mA was not exceeded at as low a coating thickness as 10 μm. This powder coating 1 moreover was applied to a tin-plated can body (deposit of 2.8 mg/m$^2$) in a coating thickness of 15 μm and stoved for 30 seconds at an object temperature of 280° C. The coating thus obtained was subjected to a sterilization test (30 minutes, 1.6 bar, 128° C.) in various test media. After the sterilization, the water absorption, adhesion (visually) and elasticity were tested. The results are summarized in Table 1.

TABLE 1

| | Test results on powder coating 1 (coating thickness 15 μm, d 90 = 1 − 25 μm) | | | | |
|---|---|---|---|---|---|
| | unex.[3] | H$_2$O | 3% NaCl[4] | 3% HAc[5] | 5% EtOH[6] |
| H$_2$O absorption | — | none | none | none | none |
| Adhesion[1] | ch 0 | ch 0 | ch 0 | ch 1 | ch 0 |
| T bend[2] | T0 | T0 | T0 | T0 | T0 |

Notes relating To Table 1:
[1]Testing of adhesion by the cross-hatch method (DIN 53151)
[2]Testing in accordance with the ECCA (European Coil Coating Association) specifications
[3]Treating of the non-exposed coating before sterilization
[4]Test medium 3% strength aqueous sodium chloride solution
[5]Test medium = 3% strength aqueous acetic acid
[6]Test medium = 5% strength aqueous ethanol solution Comparative Example 1

A powder coating was prepared analogously to Example 1 from the components described in Example 1. In contrast to Example 1, a particle size distribution customary for powder coatings was this time established on a safe [sic] mill. Specifically, the maximum particle size of at least 99 percent by weight of the particles of this powder coating 2 is ≦100 μm. At least 90 percent by weight of the powder coating particles have a particle size of between 1 and 70 μm (d 90=1 to 70 μm). The mean particle size is 35 μm. The gradient S at the point of inflection of the particle distribution is 135. This powder coating 2 was applied in various coating thicknesses to a can body (opening ⌀73 mm, body length 110 mm) by means of suitable equipment, stoved at an object temperature of 280° C. for 30 seconds and then subjected to the enamel rater test described in Example 1. The following results were obtained:

| Coating thickness (μm) | 15 | 30 | 40 | 50 |
|---|---|---|---|---|
| Current intensity I (mA) | >100 | >100 | 22 | <1 |

Powder coating 2 thus cannot be applied without pores in the thin coatings required by the packaging industry. Moreover, these high powder coating thicknesses very quickly flake away from the can sheet metal during the crimping process.

Comparative Example 2

A powder coating was prepared analogously to Example 1 from the components described in Example 1. In contrast to Example 1, the powder coating was ground on a sifter mill so that the maximum particle size of at least 99 percent by weight of the particles of this powder coating 3 is ≦50 μm (customary fine grinding). At least 90 percent by weight of the powder coating particles have a particle size of between 1 and 30 μm (d 90=1 to 30 μm). The mean particle size is 15 μm. The gradient at the point of inflection of the particle distribution curve is 92.

This powder coating 3 showed very poor fluidization and application properties in application units available on the market. Can bodies could be coated only with extreme difficulty. Blockages occurred in the powder coating delivery equipment. Powder coating 3 had a strong tendency to form agglomerates, so that the coating had a clearly non-uniform coating thickness. In spite of these difficulties, this powder coating 3 was applied in various coating thicknesses to a can body (opening ⌀73 mm, body length 110 mm), stoved at an object temperature of 280° C. for 30 seconds and then subjected to the enamel rater test described in Example 1. The following results were obtained:

| Coating thickness (μm) | 15 | 20 | 25 | 35 | 45 |
|---|---|---|---|---|---|
| Current intensity I (mA) | >100 | 78 | 34 | 7 | <1 |

In comparison with powder coating 2, this powder coating 3 thus forms pore-free films even at a significantly reduced coating thickness, but these coating thicknesses too are still significantly above the thin coating thickness of ≦15 μm required by the manufacturers of packaging containers. This powder coating 3 moreover has very poor application properties, in contrast to powder coating 1 from Example 1.

Comparative Example 3

Powder coating 3 obtained according to Comparative Example 2 was sieved over a 32 μm carbon fiber sieve. Powder coating 4 thus obtained has a maximum particle size for at least 99 percent by weight of the particles of ≦32 μm. At least 90 percent by weight of the powder coating particles have a particle size of between 1 and 25 μm (d 90=1 to 20 μm). The mean particle size is 8 μm. The gradient at the point of inflection of the particle distribution curve is 80.

The resulting powder coating 4 formed into lumps in the reservoir vessel within a very short time, and could not be fluidized again, so that no coatings could be produced.

We claim:
1. Powder coating based on epoxy resins and phenolic hardeners, comprising
   A) at least one epoxy resin having an epoxide equivalent weight of from 300 to 5500 and
   B) at least one hardener having more than one phenolic hydroxyl group per molecule and a hydroxyl equivalent weight, based on the phenolic OH groups, of from 100 to 500,
   wherein the powder coating has a particle size distribution such that
   a) at least 90 percent by weight of the powder coating particles have a particle size of between 1 and 60 μm,
   b) the maximum particle size of the powder coating particles is 100 μm for at least 99 percent by weight of the particles,
   c) the mean particle size of the powder coating particles is between 5 and 20 μm and
   d) the gradient of the particle distribution curve at the point of inflection is ≧100.
2. Powder coating according to claim 1, having a particle size distribution such that
   a) at least 90 percent by weight of the powder coating particles have a particle size of between 1 and 40 μm,
   b) the maximum particle size of powder coating particles is ≦60 μm for at least 99 percent by weight of the particles,
   c) the mean particle size of the powder coating particles is between 5 and 12 μm and
   d) the gradient of the particle distribution curve at the point of inflection is ≦150.
3. Powder coating as claimed in claim 1, characterized in that it has a particle size distribution such that
   a) at least 90 percent by weight of the powder coating particles have a particle size of between 5 and 25 μm,
   b) the maximum particle size of the powder coating particles is ≦40 μm for at least 99 percent by weight of the particles,
   c) the mean particle size of the powder coating particles is between 5 and 12 μm and
   d) the gradient of the particle distribution curve at the point of inflection is ≧200.
4. Powder coating according to claim 1, wherein component A is selected from the group consisting of epoxy resins based on bisphenol A, epoxy resins based on bisphenol F, epoxidized novolac resins and mixtures thereof.
5. Powder coating as claimed in claim 1, wherein component A, is selected from the group consisting of epoxy resins based on bisphenol A and epoxy resins based on bisphenol F wherein the resins have an epoxide equivalent weight of from 500 to 2000 and epoxy resins of the novolak type having an epoxide equivalent weight of from 500 to 1000 and mixtures thereof.
6. Powder coating as claimed in claim 1, wherein component B, is a hardener having a hydroxyl equivalent weight, based on the phenolic OH groups, of from 200 to 300.
7. A powder coating as claimed in claim 1, wherein component B is a hardener having from 1.8 to 4, phenolic hydroxyl groups per molecule.
8. A powder coating as claimed in claim 1, wherein component B is selected from the group consisting of hardeners based on bisphenol A, hardeners based on bisphenol F and mixtures thereof.
9. A powder coating as claimed in claim 1, characterized in that it comprises

A) from 29 to 80% by weight, based on the total weight of the powder coating, of epoxy resin component A and B) from 10 to 50% by weight, based on the total weight of the powder coating, of hardener component B.

10. Process for internal coating of packaging containers, characterized in that a powder coating according to claim 1 is applied in a coating thickness of $\leq 15$ μm.

11. A powder coating as claimed in claim 1 comprising a coating for internal coating of packaging containers.

12. Powder coating as claimed in claim 1, wherein component B is a hardener having $\leq 3$ phenolic hydroxyl groups per molecule.

* * * * *

UNITED STATES PATENT AND TRADEMARK OFFICE
CERTIFICATE OF CORRECTION

PATENT NO. : 5,605,985
DATED : February 25, 1997
INVENTOR(S) : Josef Rademacher, Udo Reiter and Peter Lessmeister It is certified that error appears in the above-identified patent and that said Letters Patent are hereby corrected as shown below:

Column, Claim 2, d), line 31, please delete " $\leq 150$ " and insert -- $\geq 150$ --.

Signed and Sealed this

Fifteenth Day of May, 2001

Attest:

NICHOLAS P. GODICI

Attesting Officer     Acting Director of the United States Patent and Trademark Office